United States Patent
Jensen

(10) Patent No.: US 10,902,154 B2
(45) Date of Patent: Jan. 26, 2021

(54) DATA SECURITY

(71) Applicant: Memoscale AS, Trondheim (NO)

(72) Inventor: Rune Erlend Jensen, Trondheim (NO)

(73) Assignee: MEMOSCALE AS, Trondheim (NO)

( * ) Notice: Subject to any disclaimer, the term of this patent is extended or adjusted under 35 U.S.C. 154(b) by 115 days.

(21) Appl. No.: 16/134,574

(22) Filed: Sep. 18, 2018

(65) Prior Publication Data

US 2019/0087605 A1 Mar. 21, 2019

(30) Foreign Application Priority Data

Sep. 19, 2017 (GB) .................................. 1715073.1

(51) Int. Cl.
*H04L 29/06* (2006.01)
*G06F 21/64* (2013.01)
(Continued)

(52) U.S. Cl.
CPC .......... *G06F 21/64* (2013.01); *G06F 21/6218* (2013.01); *H03M 13/3761* (2013.01);
(Continued)

(58) Field of Classification Search
CPC ............................. G06F 21/64; G06F 21/6218; H03M 13/3761; H03M 13/1102; H03M 13/1515;
(Continued)

(56) References Cited

U.S. PATENT DOCUMENTS 6,353,895 B1 3/2002 Stephenson
9,026,729 B1 5/2015 Hallak et al.
(Continued)

OTHER PUBLICATIONS

GB Intellectual Property Office, Combined Search and Examination Report under Sections 17 & 18(3), GB Application No. 1715073.1, dated Nov. 6, 2017.

*Primary Examiner* — Michael S McNally

(74) *Attorney, Agent, or Firm* — Saliwanchik, Lloyd & Eisenschenk

(57) ABSTRACT

Disclosed herein is a computer-implemented method of including signatures of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method comprising: calculating K signatures in dependence on sub-blocks comprised by the source nodes, wherein each of the signatures is associated with a different one of the K source nodes, each of the K signatures is associated with a different block and each of the K signatures is calculated in dependence on all of the sub-blocks of the source node that the signature is associated with except the one sub-block of the source node that is also comprised by the block that the signature is associated with; and generating one or more sub-blocks of the source and redundant nodes in dependence on the K signatures. Advantages include one or more of improved determination of whether or not the stored data comprises errors, an increase in the number of errors that can detected, improved recovery from errors and improved detection of tampering of the data. By including signatures within the stored data rather than as metadata, the signatures do not increase the amount of metadata required.

19 Claims, 16 Drawing Sheets

(51) Int. Cl.
  *H04L 9/32*      (2006.01)
  *H04L 9/08*      (2006.01)
  *G06F 21/62*     (2013.01)
  *H03M 13/37*     (2006.01)
  *H04L 9/14*      (2006.01)
  *H03M 13/11*     (2006.01)
  *H03M 13/15*     (2006.01)

(52) U.S. Cl.
  CPC .............. *H04L 9/0825* (2013.01); *H04L 9/14* (2013.01); *H04L 9/3242* (2013.01); *H04L 9/3247* (2013.01); *H04L 9/3249* (2013.01); *H04L 63/123* (2013.01); *H03M 13/1102* (2013.01); *H03M 13/1515* (2013.01)

(58) Field of Classification Search
  CPC ....... H04L 9/0825; H04L 9/14; H04L 9/3242; H04L 9/3247; H04L 9/3249; H04L 63/123
  USPC ......................................................... 713/176
  See application file for complete search history.

(56) References Cited

U.S. PATENT DOCUMENTS

| | | | |
|---|---|---|---|
| 9,104,342 B2* | 8/2015 | Bourbonnais | G06F 11/1076 |
| 2004/0078642 A1 | 4/2004 | Nanda | |
| 2009/0006886 A1 | 1/2009 | O'Connor et al. | |

\* cited by examiner

| D1 | D2 | D3 | Dr1 |
|---|---|---|---|
| $D1_1$ | $D2_1$ | $D3_1$ | $Dr1_1 = D1_1 + D2_1 + D3_1$ |
| ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ |
| $D1_{x-3}$ | $D2_{x-3}$ | $D3_{x-3}$ | $Dr1_{x-3} = (D1_{x-3} + SIG(D1 \setminus D1_{x-3})) + D2_{x-3} + D3_{x-3}$ |
| $D1_{x-2}$ | $D2_{x-2}$ | $D3_{x-2}$ | $Dr1_{x-2} = D1_{x-2} + (D2_{x-2} + SIG(D2 \setminus D2_{x-2})) + D3_{x-2}$ |
| $D1_{x-1}$ | $D2_{x-1}$ | $D3_{x-1}$ | $Dr1_{x-1} = D1_{x-1} + D2_{x-1} + (D3_{x-1} + SIG(D3 \setminus D3_{x-1}))$ |
| $D1_x$ | $D2_x$ | $D3_x$ | $Dr1_x = D1_x + D2_x + D3_x + SIG(Dr1 \setminus Dr1_x)$ |

Figure 1

| D1 | D2 (Dr1) |
|---|---|
| $D1_1$ | $D2_1 = D1_1$ |
| ... | ... |
| $D1_{x-2}$ | $D2_{x-2} = D1_{x-2}$ |
| $D1_{x-1}$ | $D2_{x-1} = D1_{x-1} + SIG(D1 \setminus D1_{x-1})$ |
| $D1_x$ | $D2_x = D1_x + SIG(D2 \setminus D2_x)$ |

Figure 2

| D1 | D2 | D3 | Dr1 | Dr2 |
|---|---|---|---|---|
| $D1_1$ | $D2_1$ | $D3_1$ | $Dr1_1 = D1_1 + D2_1 + D3_1$ | $Dr2_1 = D1_1 + D2_1^2 + D3_1^3$ |
| ... | ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ | $Dr2_{x-4} = D1_{x-4} + D2_{x-4}^2 + D3_{x-4}^3$ |
| $D1_{x-3}$ | $D2_{x-3}$ | $D3_{x-3}$ | $Dr1_{x-3} = (D1_{x-3} + SIG(D1 \setminus D1_{x-3})) + D2_{x-3} + D3_{x-3}$ | $Dr2_{x-3} = (D1_{x-3} + SIG(D1 \setminus D1_{x-3})) + D2_{x-3}^2 + D3_{x-3}^3$ |
| $D1_{x-2}$ | $D2_{x-2}$ | $D3_{x-2}$ | $Dr1_{x-2} = D1_{x-2} + (D2_{x-2} + SIG(D2 \setminus D2_{x-2})) + D3_{x-2}$ | $Dr2_{x-2} = D1_{x-2} + (D2_{x-2} + SIG(D2 \setminus D2_{x-2}))^2 + D3_{x-2}^3$ |
| $D1_{x-1}$ | $D2_{x-1}$ | $D3_{x-1}$ | $Dr1_{x-1} = D1_{x-1} + D2_{x-1} + (D3_{x-1} + SIG(D3 \setminus D3_{x-1}))$ | $Dr2_{x-1} = D1_{x-1} + D2_{x-1}^2 + (D3_{x-1} + SIG(D3 \setminus D3_{x-1}))^3$ |
| $D1_x$ | $D2_x$ | $D3_x$ | $Dr1_x = D1_x + D2_x + D3_x + SIG(Dr1 \setminus Dr1_x)$ | $Dr2_x = D1_x + D2_x^2 + D3_x^3 + SIG(Dr2 \setminus Dr2_x)^2$ |

Figure 3

| D1 | D2 | D3 | Dr1 | Dr2 |
|---|---|---|---|---|
| $D1_1$ | $D2_1$ | $D3_1$ | $Dr1_1 = D1_1 + D2_1 + D3_1$ | $Dr2_1 = D1_1 + D2_1^2 + D3_1^3$ |
| ... | ... | ... | ... | ... |
| $D1_{x-5}$ | $D2_{x-5}$ | $D3_{x-5}$ | $Dr1_{x-5} = D1_{x-5} + D2_{x-5} + D3_{x-5}$ | $Dr2_{x-5} = D1_{x-5} + D2_{x-5}^2 + D3_{x-5}^3$ |
| $D1_{x-4}$ | $D2_{x-4}$ | $D3_{x-4}$ | $Dr1_{x-4} = (D1_{x-4} + SIG(D1 \setminus D1_{x-4})) + D2_{x-4} + D3_{x-4}$ | $Dr2_{x-4} = (D1_{x-4} + SIG(D1 \setminus D1_{x-4})) + D2_{x-4}^2 + D3_{x-4}^3$ |
| $D1_{x-3}$ | $D2_{x-3}$ | $D3_{x-3}$ | $Dr1_{x-3} = D1_{x-3} + (D2_{x-3} + SIG(D2 \setminus D2_{x-3})) + D3_{x-3}$ | $Dr2_{x-3} = D1_{x-3} + (D2_{x-3} + SIG(D2 \setminus D2_{x-3}))^2 + D3_{x-3}^3$ |
| $D1_{x-2}$ | $D2_{x-2}$ | $D3_{x-2}$ | $Dr1_{x-2} = D1_{x-2} + D2_{x-2} + (D3_{x-2} + SIG(D3 \setminus D3_{x-2}))$ | $Dr2_{x-2} = D1_{x-2} + D2_{x-2}^2 + (D3_{x-2} + SIG(D3 \setminus D3_{x-2}))^3$ |
| $D1_{x-1}$ | $D2_{x-1}$ | $D3_{x-1}$ | $Dr1_{x-1} = D1_{x-1} + D2_{x-1} + D3_{x-1} + SIG(Dr1 \setminus Dr1_{x-1})$ | $Dr2_{x-1} = D1_{x-1} + D2_{x-1}^2 + D3_{x-1}^3$ |
| $D1_x$ | $D2_x$ | $D3_x$ | $Dr1_x = D1_x + D2_x + D3_x$ | $Dr2_x = D1_x + D2_x^2 + D3_x^3 + SIG(Dr2 \setminus Dr2_x)$ |

Figure 4

| D1 | D2 (Dr1) | D3 (Dr2) |
|---|---|---|
| $D1_1$ | $Dr1_1 = D1_1$ | $Dr2_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}$ | $Dr1_{x-2} = D1_{x-2} + SIG(D1 \setminus D1_{x-2})$ | $Dr2_{x-2} = (D1_{x-2} + SIG(D1 \setminus D1_{x-2}))$ |
| $D1_{x-1}$ | $Dr1_{x-1} = D1_{x-1} + SIG(Dr1 \setminus Dr1_{x-1})$ | $Dr2_{x-1} = D1_{x-1}$ |
| $D1_x$ | $Dr1_x = D1_x$ | $Dr2_x = D1_x + SIG(Dr2 \setminus Dr2_x)$ |

Figure 6

| D1 | D2 (Dr1) | D3 (Dr2) |
|---|---|---|
| $D1_1$ | $Dr1_1 = D1_1$ | $D3_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}$ | $Dr1_{x-2} = D1_{x-2}$ | $Dr2_{x-2} = D1_{x-2}$ |
| $D1_{x-1}$ | $Dr1_{x-1} = D1_{x-1} + SIG(D1 \setminus D1_{x-1})$ | $Dr2_{x-1} = D1_{x-1} + SIG(D1 \setminus D1_{x-1})$ |
| $D1_x$ | $Dr1_x = D1_x + SIG(Dr1 \setminus Dr1_x)$ | $Dr2_x = D1_x + SIG(Dr2 \setminus Dr2_x)$ |

Figure 7

| D1 | D2 (Dr1) | D3 (Dr2) |
|---|---|---|
| $D1_1$ | $Dr1_1 = D1_1$ | $Dr2_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}$ | $Dr1_{x-2} = D1_{x-2}$ | $Dr2_{x-2} = D1_{x-2}$ |
| $D1_{x-1}$ | $Dr1_{x-1} = D1_{x-1} + SIG(D1 \setminus D1_{x-1})$ | $Dr2_{x-1} = D1_{x-1} + SIG(D1 \setminus D1_{x-1})$ |
| $D1_x$ | $Dr1_x = D1_x + SIG(Dr1 \setminus Dr1_x)$ | $Dr2_x = D1_x + SIG(Dr2 \setminus Dr2_x)^2$ |

Figure 8

| D1 | D2 | D3 | Dr1 |
|---|---|---|---|
| $D1_1$ | $D2_1$ | $D3_1$ | $Dr1_1 = D1_1 + D2_1 + D3_1$ |
| ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ |
| $D1_{x-3}' = D1_{x-3} + SIG(D1 \setminus D1_{x-3})$ | $D2_{x-3}$ | $D3_{x-3}$ | $Dr1_{x-3} = D1_{x-3} + D2_{x-3} + D3_{x-3}$ |
| $D1_{x-2}$ | $D2_{x-2}' = D2_{x-2} + SIG(D2 \setminus D2_{x-2})$ | $D3_{x-2}$ | $Dr1_{x-2} = D1_{x-2} + D2_{x-2} + D3_{x-2}$ |
| $D1_{x-1}$ | $D2_{x-1}$ | $D3_{x-1}' = D3_{x-1} + SIG(D3 \setminus D3_{x-1})$ | $Dr1_{x-1} = D1_{x-1} + D2_{x-1} + D3_{x-1}$ |
| $D1_x$ | $D2_x$ | $D3_x$ | $Dr1_x = D1_x + D2_x + D3_x + SIG(Dr1 \setminus Dr1_x)$ |

Figure 9

| D1 | Dr1 | Dr2 |
|---|---|---|
| $D1_1$ | $Dr1_1 = D1_1$ | $Dr2_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}' = D1_{x-2} + SIG(D1 \setminus D1_{x-2})$ | $Dr1_{x-2} = D1_{x-2}$ | $Dr2_{x-2} = D1_{x-2}$ |
| $D1_{x-1}$ | $Dr1_{x-1} = D1_{x-1} + SIG(Dr1 \setminus Dr1_{x-1})$ | $Dr2_{x-1} = D1_{x-1}$ |
| $D1_x$ | $Dr1_x = D1_x$ | $Dr2_x = D1_x + SIG(Dr2 \setminus Dr2_x)$ |

Figure 10

|           | Source Nodes | | Redundant Nodes | |
|-----------|:---:|:---:|:---:|:---:|
| Set 1 | D1 | D2 | R1<br>D1c<br>D2c<br>R1c<br>R1 | R2<br>D1c<br>D2c<br>R2<br>R2c |
| Set 2 | D3 | D4 | R3<br>D3c<br>D4c<br>R3c<br>R3 | R4<br>D3c<br>D4c<br>R4<br>R4c |
| Set 3 | D5 | D6 | R5<br>D1c<br>D2c<br>D3c<br>D4c<br>D5c<br>D6c<br>R5c<br>R5 | R6<br>D5c<br>D6c<br>R6<br>R6c |

Figure 11

| D1 | Dr1 |
|---|---|
| $D1_1$ | $Dr1_1 = D1_1$ |
| ... | ... |
| $D1_Y$ | $Dr1_Y = D1_Y$ |
| $D1_{Y+1}$ | $Dr1_{Y+1} = D1_{Y+1}$ |
| ... | ... |
| ... | ... |
| $D1_{X-2}$ | $Dr1_{X-2} = D1_{X-2}$ |
| $D1_{X-1}$ | $Dr1_{X-1} = D1_{X-1} + SIG(D1_1 \text{ to } D1_Y) + SIG(D1_{Y+1} \text{ to } D1_{X-1})$ |
| $D1_X$ | $Dr1_X = D1_X + SIG(Dr1 \setminus Dr1_x)$ |

Figure 12

| D1 | D2 | D3 | Dr1 |
|---|---|---|---|
| $D1_1$ | $D2_1$ | $D3_1$ | $Dr1_1 = D1_1 + D2_1 + D3_1$ |
| ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ |
| $D1_{x-3}$ | $D2_{x-3}$ | $D3_{x-3}$ | $Dr1_{x-3} = D1_{x-3} + D2_{x-3} + D3_{x-3}$ |
| $D1_{x-2}$ | $D2_{x-2}$ | $D3_{x-2}$ | $Dr1_{x-2} = D1_{x-2} + D2_{x-2} + D3_{x-2}$ |
| $D1_{x-1}$ | $D2_{x-1}$ | $D3_{x-1}$ | $Dr1_{x-1} = (D1_{x-1} + SIG(D1 \setminus D1_{x-1})) + (D2_{x-1} + SIG(D2 \setminus D2_{x-1})) + (D3_{x-1} + SIG(D3 \setminus D3_{x-1}))$ |
| $D1_x$ | $D2_x$ | $D3_x$ | $Dr1_x = D1_x + D2_x + D3_x + SIG(Dr1 \setminus Dr1_x)$ |

Figure 13

|       | Source Nodes | | Redundant Nodes | |
|-------|----|----|----|----|
| Set 1 | D1 | D2 | R1<br><br>D1c<br>D2c<br>R1c<br>R1 | R2<br><br>D1c<br>D2c<br>R2<br>R2c |
| Set 2 | D3 | D4 | R3<br><br>D3c<br>D4c<br>R3c<br>R3 | R4<br><br>D3c<br>D4c<br>R4<br>R4c |
| Set 3 | D5 | D6 | R5<br><br>D5c<br>D6c<br>R5c<br>R5 | R6<br><br>D5c<br>D6c<br>R6<br>R6c |
|       | Dĉ | Dĉ | Dĉ | Dĉ |

Figure 14

|       | Source Nodes | | Redundant Nodes | |
|-------|------|------|------|------|
| Set 1 | D1 | D2 | R1<br><br>D1c<br>D2c<br>R1c<br>R1 | R2<br><br>D1c<br>D2c<br>R2<br>R2c |
| Set 2 | D3 | D4 | R3<br><br>D3c<br>D4c<br>R3c<br>R3 | R4<br><br>D3c<br>D4c<br>R4<br>R4c |
| Set 3 | D5 | D6 | R5<br><br>D5c<br>D6c<br>R5c<br>R5 | R6<br><br>D5c<br>D6c<br>R6<br>R6c |

System Node(s): $\hat{Dc}$

DATA SECURITY

CROSS-REFERENCE TO RELATED APPLICATION

This application claims the benefit under 35 U.S.C. § 119 of United Kingdom Patent Application No. 1715073.1, filed Sep. 19, 2017, which is hereby incorporated by reference in its entirety.

FIELD

The field of the invention is the coding of data. Embodiments calculate signatures of source data and then include these signatures within redundant data. Advantages include one or more of improved verification of data and improved recovery from data errors. In particular, data security is improved as tampering of the source data can be detected.

BACKGROUND OF THE INVENTION

An ever increasing amount of data is being stored in large capacity distributed data storage systems. RAID (Redundant Array of Independent Disks) are well known configurations of distributed data storage systems. The different configurations are described by RAID levels. RAID levels of 1 and above introduce redundant data into stored data. Redundancy allows a loss of data to be detected and, in some circumstances, the lost data can be recovered.

Data drives have traditionally been provided by mechanical storage media. These can be unreliable because the stored data within mechanical storage media can be corrupted due to, for example, data corruption caused by radiation, physical defects or transition error. SSDs (solid-state drives) are preferable over mechanical storage media because they have faster access times and are not as vulnerable to mechanical problems. However, SSDs are more vulnerable to data corruption than mechanical drives as their medium is more volatile.

In a data storage system there are many possible causes of data loss. For example, failures of data drives may occur, cabling may be faulty, controller mistakes may cause data to be written in the wrong place and stored data may be corrupted. Data erasures and data errors are different types of data loss in a data storage system. For data erasures, it is known with full certainty where the data loss has occurred. For example, if a data drive fails, the data within that data drive has been lost. A controller of the data storage system will determine that the data drive has failed, due to the lack of response of the failed data drive, and so it is known where the data loss has occurred. For data errors, it can be determined that there is an error in the data but the location of the error is harder to determine with full certainty, and it may not be possible to determine the location of the error. For example, if data within an SSD is corrupted due to electro-magnetic radiation, a parity check of the stored data in an array of SSDs including the SSD will determine that an error has occurred in one of the SSDs. However, there has been no failure of any part of the SSD and so it is not possible to determine in which SSD of the array of SSDs the error has occurred. The parity check alone therefore only informs a system operator that there is an error in the data and does not provide sufficient information for the error to be corrected. Data errors are sometimes referred to as silent data corruption and it is more difficult to recover data loss from errors than from erasures.

In order to improve the handling of errors in stored data, it is known to generate and store redundant data, such as parity data. It is also known to calculate properties of the stored data, such as checksums, and to store the properties in metadata. The number of errors that can be detected and/or recovered from depends on what redundant data and metadata is generated. The additional storage requirements due to the redundant data is often significant. However, in some implementations, the metadata of a data storage system is also a significant overhead and may increase the data storage requirements by up to 4%.

Known implementations of data storage systems differ in the amount of redundant data storage, how the redundant data is calculated, what properties of the metadata are calculated and how the properties of the metadata are calculated.

Another source of data error is data tampering. Data tampering includes any incorrectly made changes to source data. Data tampering may be caused by malicious activity or incorrect user operation. Redundant data can also be used to correct errors caused by data tampering.

There is a need to improve known coding techniques so as to improve the recovery from errors in data storage systems. More generally, there is a need to improve coding techniques so as to improve error detection and error correction, in particular the detection of data tampering, in data storage and data communication applications.

BRIEF SUMMARY OF THE INVENTION

According to a first aspect of the invention, there is provided a computer-implemented method of including signatures of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method comprising: calculating K signatures in dependence on sub-blocks comprised by the source nodes, wherein each of the signatures is associated with a different one of the K source nodes, each of the K signatures is associated with a different block and each of the K signatures is calculated in dependence on all of the sub-blocks of the source node that the signature is associated with except the one sub-block of the source node that is also comprised by the block that the signature is associated with; and generating one or more sub-blocks of the source and/or redundant nodes in dependence on the K signatures.

Preferably, the method further comprises: calculating one or more further signatures in dependence on sub-blocks comprised by one or more redundant nodes, wherein each of said further signatures is associated with a different one of the R redundant nodes, each of said further signatures is associated with a block that is different from all other blocks for which there is an associated signature that is associated with a source node, and each of said further signatures is calculated in dependence on all of the sub-blocks of the redundant node that the signature is associated with except the one sub-block of the redundant node that is also comprised by the block that the signature is associated with; and generating one or more sub-blocks of the source and/or redundant nodes in dependence on said further signatures.

Preferably, different sub-blocks of the same redundant node are generated in dependence on each of the signatures.

Preferably, sub-blocks comprised by any of the source nodes are not generated in dependence on a signature.

Preferably, the method further comprises generating, for each block with an associated signature, a sub-block of the block that is comprised by a redundant node in dependence on a combination of all of the sub-blocks of the block that are comprised by a source node and the signature associated with the block.

Preferably, the method further comprises generating, for each sub-block in at least one redundant node, the sub-block in dependence on a combination of all of the sub-blocks in the same block as said sub-block and comprised by source nodes.

Preferably, the method further comprises generating, for at least one redundant node, the sub-blocks of the redundant node that are not comprised by blocks with an associated signature in dependence on a combination of sub-blocks comprised by the source data nodes only.

Preferably, one or more of the sub-blocks of one or more of the redundant nodes are generated in dependence on a XOR combination.

Preferably, R is 1.

Preferably, R is 2 or more.

Preferably, K is 1.

Preferably, K is 2 or more.

Preferably, the size of each sub-block is the same as the size of each signature.

Preferably, each signature is calculated according to a technique that allows verification of the data that the signature is generated in dependence on.

Preferably, each signature is calculated as any of a digital signature algorithm, message authentication code, keyed-hash message authentication code, ECDSA, RSA, Full Domain Hash or Boneh-Lynn-Shacham.

Preferably, each block with an associated signature is associated with first and second signatures, the first signature being the signature as in any preceding statement, and a sub-block that is comprised by a first redundant node is generated in dependence on said first signature, and a sub-block that is comprised by a second redundant node is generated in dependence on said second signature.

Preferably, for each block with a first signature that is associated with a source node, the second signature is the same as the first signature.

Preferably, for each block with a first signature associated with a first redundant node, the second signature is generated in dependence on all of the sub-blocks of a second redundant node except the one sub-block of the second redundant node that is comprised by the block associated with the signature.

Preferably, in each of the redundant nodes, there is a sub-block that is generated in dependence on a signature that is associated with the redundant node that comprises said sub-block, and said signature is generated in dependence on all of the sub-blocks of the redundant node except said sub-block that is generated in dependence on said signature.

Preferably, there is no block that comprises two sub-blocks that are both generated in dependence on signatures that have both been generated in dependence on sub-blocks of redundant nodes.

Preferably, prior to any sub-blocks being combined with a signature, all of sub-blocks comprised by a redundant node are generated in accordance with any of maximum distance separable, MDS, coding, Reed-Solomon coding, forward error correction (FEC) coding, low-density parity-check (LDPC) coding, Local Reconstruction Codes (LRC) coding, minimum-bandwidth regenerating (MBR) coding, minimum-storage regenerating (MSR) coding, or coding with rateless codes or coding with fountain codes.

Preferably, prior to any sub-blocks being combined with a signature, all of sub-blocks comprised by all of the source and redundant nodes are generated in accordance with either a systematic or a non-systematic coding technique.

Preferably, the one or more sub-blocks of one or more redundant nodes are generated in dependence on the signature by using operations in a GF field that is higher than GF(2).

Preferably, one or more of the sub-blocks comprised by a source node are generated in dependence on a signature.

Preferably, no block comprises two sub-blocks that are generated in dependence on a signature.

Preferably, the method further comprises generating one or more of the sub-blocks in dependence on two signatures.

Preferably, the one or more of the sub-blocks that are generated in dependence on two signatures are generated in dependence on signatures that have been generated in dependence on sub-blocks comprised by different source nodes.

Preferably, each signature, that is calculated in dependence on all of the sub-blocks of the source node that the signature is associated with except the one sub-block of the source node that is also comprised by the block that the signature is associated with, can be updated in increments.

Preferably, each node is data drive of a data storage system.

Preferably, each block is a data packet for transmission over a network.

Preferably, each signature is generated using a private key.

Preferably, the private key is retained within the system of an authorised entity.

Preferably, each signature is generated using a private key and public key pair.

Preferably, the verification of the data that a signature has been generated in dependence on only requires the public key and not the private key.

Preferably, the verification of a signature can be performed at the node comprising the signature.

Preferably, the method further comprises generating and storing one or more signatures with each of the signatures being of all of the data in one of the nodes; wherein each of said generated and stored signatures are stored as additional data in a node, as metadata of a node or remote from the nodes.

Preferably, the method further comprises generating and storing a signature of all of the data in the source nodes; wherein the generated and stored signature is stored as additional data in a node, as metadata of a node or remote from the nodes.

Preferably, the source data is encrypted.

According to a second aspect of the invention, there is provided a computer-implemented method, wherein there are a plurality of sets of nodes, and wherein each set comprises one or more source nodes and one or more redundant nodes, the method comprising: generating, for each set, one or more redundant nodes of the set in dependence on signatures of the source nodes of the set; and generating one or more of the redundant nodes of one of the sets further in dependence on signatures of the source nodes in all of the other sets.

Preferably, wherein one or more of the nodes of one or more of the sets are generated according to the method of the first aspect.

Preferably, wherein one or more of the nodes of one of the sets comprises one or more signatures that are generated in dependence on all of the sub-blocks of a node.

According to a third aspect of the invention, there is provided a computer-implemented method of determining if a data error has occurred, the method comprising: obtaining a plurality of sub-blocks of source data; obtaining one or more sub-blocks of redundant data, wherein at least one of the sub-blocks of redundant data has been generated in dependence on a signature of the sub-blocks of source data; determining the signature that said at least one of the sub-blocks of redundant data has been generated in dependence on; calculating a signature in dependence on the obtained sub-blocks of source data; and determining that a data error has occurred in dependence on a comparison of the signature that said at least one of the sub-blocks of redundant data has been generated in dependence on and the signature calculated in dependence on the obtained sub-blocks of source data.

Preferably, the sub-blocks of source and redundant data have been generated in accordance with the method of the first or second aspects.

Preferably, the method further comprises correcting a detected error by applying logical deduction.

According to a fourth aspect of the invention, there is provided a computer readable medium comprising instructions that, when executed, cause a computing device to perform the method of any of the first to third aspects.

According to a fifth aspect of the invention, there is provided a computer program comprising instructions that, when executed by a computing system, cause the computing system to perform the method of any of the first to third aspects.

BRIEF DESCRIPTION OF THE DRAWINGS

FIG. 1 shows data in source and redundant nodes according to an embodiment;
FIG. 2 shows data in a source node and a redundant node according to an embodiment;
FIG. 3 shows data in source and redundant nodes according to an embodiment;
FIG. 4 shows data in source and redundant nodes according to an embodiment;
FIG. 6 shows data in nodes according to an embodiment;
FIG. 7 shows data in nodes according to an embodiment;
FIG. 8 shows data in nodes according to an embodiment;
FIG. 9 shows data in nodes according to an embodiment;
FIG. 10 shows data in nodes according to an embodiment;
FIG. 11 shows data in a plurality of sets of source nodes and redundant nodes according to an embodiment;
FIG. 12 shows data in nodes according to an embodiment;
FIG. 13 shows data in nodes according to an embodiment;
FIG. 14 shows data in nodes according to an embodiment;
FIG. 15 shows data in nodes according to an embodiment.

DETAILED DESCRIPTION

Figure 5:
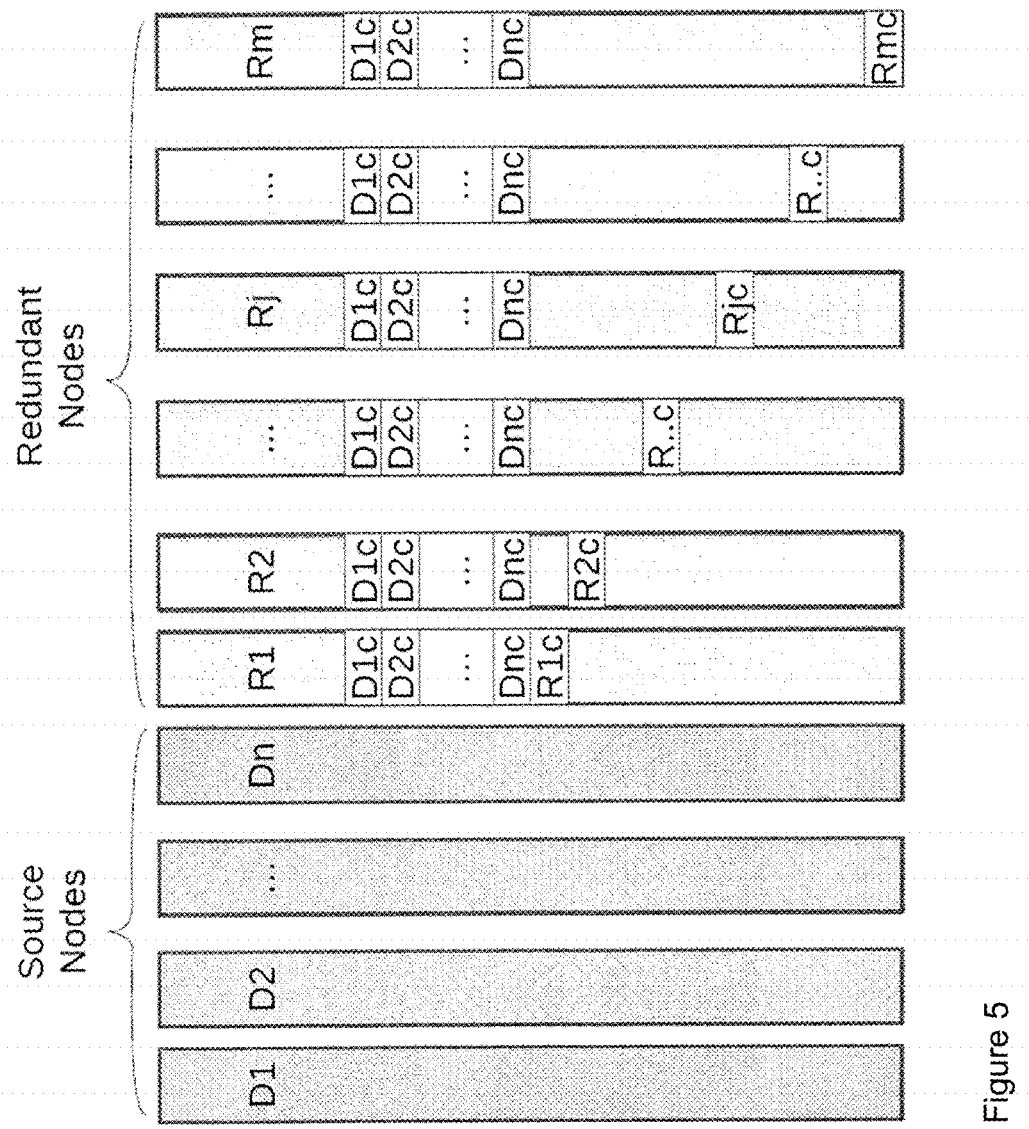
FIG. 5 shows data in source and redundant nodes according to an embodiment.

Embodiments provide a data coding technique that improves the use of properties determinable from source data. Signatures of source data are calculated and included in source and/or redundant data. Advantages of calculating the signatures include one or more of improved determination of whether or not the stored data comprises errors due to tampering or another error source, an increase in the number of errors that can detected and improved recovery from errors. By including the signatures within the stored data rather than as metadata, the signatures do not increase the amount of metadata required. In addition, if source data is changed by malicious activity of an unauthorised operator, the unauthorised operator is unable to correctly change signatures of the source data. The signatures of the source data can therefore be used to detect the malicious activity.

Throughout the present document errors in data are referred to. The errors may be from any source of data loss and include data loss due to data tampering.

Throughout the present document signatures of data are referred to. The signatures may be any of a large number of well known and commercially available types of signature in data cryptography. For example, a signature may be generated by any form of digital signature algorithm, message authentication code (MAC), keyed-hash message authentication code (HMAC), ECDSA, RSA, Full Domain Hash (FDH), Boneh-Lynn-Shacham (BLS) or other known techniques for authentication, non-repudiation and/or verifying data. The signatures of embodiments may be generated in dependence on a private key. The signatures may only have a private key, such as with a MAC, or have private and public key pairs.

Embodiments are described in more detail below.

A data coding technique according to a first embodiment is shown in FIG. 1.

A large capacity storage system is typically divided into a plurality of nodes. Each node may represent any of different data drives, stripes, sectors or parts of the data storage system.

FIG. 1 shows systematically coded data in the exemplary application of a data storage system. For systematically coded data, source data is stored in source nodes without further coding applied. Redundant data is generated in dependence on the source data and stored in redundant nodes. Each node may be a data drive of a data storage system.

In FIG. 1, each of the columns, labelled D1, D2, D3 and Dr1, represents a different node. D1, D2 and D3 are source nodes that store source data. Dr1 is a redundant node that stores redundant data.

Each node comprises a plurality of sub-blocks of data. For example, $D1_1$ is individual sub-block of node D1. The total number of sub-blocks comprised by each node is 'x' and all of the nodes comprise the same number of sub-blocks. A sub-block can also be referred to as a sub-packet.

The entire data stored in node D1 is stored in the sub-blocks $D1_1$ to $D1_x$.

The entire data stored in node D2 is stored in the sub-blocks $D2_1$ to $D2_x$.

The entire data stored in node D3 is stored in the sub-blocks $D3_1$ to $D3_x$.

The entire data stored in node Dr1 is stored in the sub-blocks $Dr1_1$ to $Dr1_x$.

All of the sub-blocks in all of the nodes are preferably the same size. The size of a sub-block that comprises a signature is at least the size of the signature. For example, a signature may be 512 bytes and each sub-block may be 512 bytes. However, embodiments also include sub-blocks comprising any amount of data so long as each sub-block that needs to comprise a signature is large enough to do so. Sub-blocks that do not need to comprise a signature may be any size. In particular, the sub-blocks may be smaller than a signature as there are erasure coding techniques allow variable sub-block sizes.

In FIG. 1, the rows represent blocks of data. A block of data comprises one sub-block from each of the nodes.

A single block of data is the row comprising the sub-blocks $D1_1$, $D2_1$, $D3_1$ and $Dr1_1$. The other single blocks of data shown in FIG. 1 are $\{D1_{X-4}, D2_{X-4}, D3_{X-4}, Dr1_{X-4}\}$, $\{D1_{X-3}, D2_{X-3}, D3_{X-3}, Dr1_{X-3}\}$, $\{D1_{X-2}, D2_{X-2}, D3_{X-2}, Dr1_{X-2}\}$, $\{D2_{X-1}, D3_{X-1}, Dr1_{X-1}\}$ and $\{D1_X, D2_X, D3_X\}$.

The data in Dr1 is calculated in dependence on the data in D1, D2 and D3.

All of sub-blocks in $Dr1_1$ to $Dr1_{X-4}$ are calculated as a combination of only the other sub-blocks of source data in the same block as the sub-block of redundant data. In FIG. 1 combinations are represented by the '+' signs. The combinations may be by, for example, XOR operations that may be performed in GF(2).

According to the present embodiment, sub-blocks $Dr1_X$, $Dr1_{X-2}$ and $Dr1_{X-3}$ of redundant data are generated in a different way from the other sub-blocks of redundant data in Dr1. Each of sub-blocks $Dr1_X$, $Dr1_{X-2}$ and $Dr1_{X-3}$ are further generated in dependence on a signature of the data.

Preferably, the signature has a one-to-one relationship with the data that it is generated in dependence on. That is to say, no two signatures can be the same as each other and generated in dependence on different data.

It is preferable for the signature have the same data size as a sub-block and for the signature to be combinable with the data in a sub-block.

According to the present embodiment, the number of signatures that are calculated is one more than the number of source nodes. Each signature is associated with both a node and a block. In the present embodiment, no two signatures are associated with the same node and each signature is associated with a different block. Each signature is calculated in dependence on all of the sub-blocks of data within the node associated with the signature except the single sub-block that is also comprised by the block associated with the signature.

In FIG. 1, signatures are represented as SIG( ). For node D1, the associated signature is represented as $SIG(D1\backslash D1_{X-3})$. The signature is therefore calculated in dependence on all of the sub-blocks of D1 except $D1_{X-3}$.

Each of the redundant sub-blocks $Dr1_X$, $Dr1_{X-2}$ and $Dr1_{X-3}$ in Dr1 are calculated in dependence on a combination of all of the sub-blocks of source data in the same block as the redundant sub-block as well as the signature associated with the block that the redundant sub-block is in.

Accordingly:

$$Dr1_{X-3}=D1_{X-3}+D2_{X-3}+D3_{X-3}+SIG(D1\backslash D1_{X-3})$$

$$Dr1_{X-2}=D1_{X-2}+D2_{X-2}+D3_{X-2}+SIG(D2\backslash D2_{X-2})$$

$$Dr1_{X-1}=D1_{X-1}+D2_{X-1}+D3_{X-1}+SIG(D3\backslash D3_{X-1})$$

$$Dr1_X=D1_X+D2_X+D3_X+SIG(Dr1\backslash Dr1_X)$$

According to the present embodiment, all but four of the sub-blocks of a redundant node are calculated in dependence on corresponding sub-blocks of source data only. Four of the sub-blocks of the redundant node are further calculated in dependence on signatures.

The present embodiment is not limited to the specific number of source data nodes described above. Suppose the number of source nodes is K, the number of redundant nodes R and the total number of nodes is N, where N=K+R. The number of signatures that are generated is K+1. The number of sub-blocks of the redundant node that are further calculated in dependence on signatures is K+1. The K+1 signatures are respectively comprised by K+1 redundant sub-blocks in Dr1.

As will be demonstrated below, the inclusion of the signatures in some of the redundant sub-blocks can advantageously allow both the presence of an error in the data to be determined and the location of the error to be determined. The correction of errors is therefore improved. Embodiments provide this advantage without changing the size of the metadata because the signatures are comprised by the redundant data.

Consider the known parity technique of all of the data in the redundant node being calculated as an XOR combination of all the data in the source nodes. The redundant data can be used to recover any one of the source nodes in the event of a data erasure. For example, if a first source node fails, and it is known with full certainty that it is the first source node that has failed, then the first source node can be reconstructed by subtracting the data in the other source nodes from the data in the redundant node.

A limitation of such a known technique is that data errors with unknown locations cannot be corrected. An error is detected whenever the data in the redundant node is not equal to a combination of the data in all of the source nodes. Although it can be determined that at least one error has occurred, the error cannot be corrected because it is not known which of the nodes comprises the error.

In addition, to verify that the source data is correct requires reading all of the sub-blocks in the redundant node, computing expected redundant data from the read source data and comparing the expected redundant data with the read redundant data.

By coding data according to embodiments, both data verification and error correction are improved.

To verify the source data, it is not necessary to read all of the sub-blocks in the redundant node. It is only necessary to read the sub-blocks of the redundant node that have been generated in dependence on a signature of a source node. In the example shown in FIG. 1, it is only necessary to read the sub-blocks $Dr1_{X-1}$, $Dr1_{X-2}$ and $Dr1_{X-3}$ in Dr1. By calculating signatures from the read source data, these can be compared with the obtainable signatures from the read redundant sub-blocks to determine if an error has occurred. Accordingly, embodiments reduce the amount of redundant data that needs to be obtained in order to verify the source data.

In addition, by coding according to embodiments, logical deduction can be used to determine the location of an error and the correction of the error is therefore possible. The coding according to the present embodiment enables detection and correction of any number of errors so long as all of the errors occur within the same single sub-block.

Signatures of each node can be directly calculated and compared with the signatures of that are already stored within the redundant node. Any mismatches between these signatures can reveal where an error has occurred and the correction of the error.

In addition, any number of errors can occur in the 4 (i.e. K+R) sub-block ranges $\{D1_1$-$D1_{X-4}\}$, $\{D2_1$-$D2_{X-4}\}$, $\{D3_1$-$D3_{X-4}\}$ and $\{Dr1_1$-$Dr1_{X-4}\}$, and still be corrected.

If errors occur in sub-blocks in different nodes, assumptions or trial based recovery may be required to recover from the errors.

The different types of silent error that may occur in the exemplary embodiment with K=3 and R=1, as shown in FIG. 1, are described below. In the following, the signatures are referred to as SIG.

There are $((K+2)*(K+R))=20$ distinct possible locations of single errors. They can be organised into 6 groups of errors:

1. $(K+R)=4$ cases of errors only occurring in a single one of the regions $\{D1_1$ to $D1_{x-4}\}$, $\{D2_1$ to $D2_{x-4}\}$, $\{D3_1$-$D3_{x-4}\}$ and $\{Dr1_1$-$Dr1_{x-4}\}$. In this circumstance, errors only result in a single SIG mismatch.
2. K=3 data sub-blocks that are not included in the SIGs for their node, i.e. $D1_{x-3}$, $D2_{x-2}$, $D3_{x-1}$. An error in these locations will also result in a single SIG mismatch.
3. R=1 redundancy sub-block not included in the SIG $Dr1_x$. An error here results in a single SIG mismatch.
4. $(K*R)=3$ cases where one of the sub-blocks in Dr1 that comprise the SIG is corrupt, i.e. $Dr1_{x-1}$, $Dr1_{x-2}$ and $Dr1_{x-3}$. An error here results in two SIG mismatches.
5. K=3 cases where the error is in a sub-block of one of the source data nodes and is comprised by the block that comprises the SIG for the redundancy drive, i.e. $D1_x$, $D2_x$ and $D3_x$. An error here results in two SIG mismatches.
6. $(K*(K-1))=6$ cases where the error is in a sub-block of one of the source data nodes and is comprised by the block that comprises the SIG for a source node. An error here results in two SIG mismatches.

In the case of a single silent error, there are two possibilities:
a) There is a single SIG mismatch
b) There are two SIG mismatches A possible logical deduction technique for recovering from the errors is explained below:
a) With a single SIG mismatch it is possible to directly determine the node with the error. For example, if the mismatch is in $SIG(D1\backslash D1_{x-3})$ an error must have occurred in either $D1_1$ to $D1x-4$ or $D1x-3$. Note that $D1_{x-2}$, $D1_{x-1}$, $D1_1$ and $Dr1_{x-3}$ must be error free or else there would have been a mismatch with another SIG. The data comprising an error can be replaced by data recreated from the sub-blocks that have been determined to not comprise errors. This applies to situations 1), 2) and 3) above.
b) When there are two SIG mismatches, there are either multiple corrupted sub-blocks, or a single sub-block error. In situations 4) and 5), there is both one mismatched data SIG and one mismatched redundancy SIG ($Dr1_x$). It is necessary to determine if there is a single error or multiple errors. Suppose that the mismatched source data SIG is called Y and there is a detected error in $SIG(DY\backslash DY_{x-(4-Y)})$. We now assume the error to be in $Dr1_{x-(4-Y)}$, and recover this word using only words from the data drives with the parity equation $Dr1_{x-(4-Y)}'=D1_{x-(4-Y)}+D2_{x-(4-Y)}+D3_{x-(4-Y)}+SIG(DY\backslash DY_{x-(4-Y)})$. If this the new word $Dr1_{x-(4-Y)}'$ and the stored word $Dr1_{x-(4-Y)}$ differ one error has been found. In the case they differ, it is possible to re-compute the $SIG(Dr1\backslash Dr1_x)$ with this new data. If this new SIG does match the stored one, the sub-block comprising an error and the correct reconstructed sub-block have been determined. This covers situation 4 above. In the case that they do not match, it is determined that there are multiple sub-blocks with errors. If, the new word $Dr1_{x-(4-Y)}'$ and the stored word $Dr1_{x-(4-Y)}$ were equal, it is determined that there was no error in $Dr1x-(4-Y)$. Next assume that the error lies in $DY_x$. We compute $SIG(Dr1\backslash Dr1_x)$ and use the equation $Dr1_x=D1_x+D2_x+D3_x+SIG(Dr1\backslash Dr1_x)$ to compute $DY_x'=Dr1_x-(Dj_x+Dk_x+SIG(Dr1\backslash Dr1_x))$ where j,k are determinable sub-blocks. If $DY_x'$ and $DY_x$ differ, the location of an error has been determined. The stored $SIG(Dr1\backslash Dr1x)$, can be compared against the computed SIG. If they match, the sub-block comprising an error and the correct reconstructed sub-block have been determined. This covers situation 5 above, and shows how to distinguish from case 4. In the case the SIGs do not match we know that there are multiple sub-blocks with errors. If $DY_x'$ and $DY_x$ are equal, there are multiple words with errors. Accordingly, embodiments allow recovery in situations 4) and 5) above and also detect multiple errors. In case 6) there are two mismatched source data SIGs. Suppose that the first mismatched data SIG is Y when there is an error with $SIG(DY\backslash DYx-(4-Y))$, and the second mismatched data SIG Z when there is an error with $SIG(DZ\backslash DZx-(4-Z))$. In this case it is known that the redundancy and all the stored SIGs are correct. Assume that the error lies in either $DYx-(4-Z)$ or in $DZx-(4-Y)$. Use the computed $SIG(DY\backslash DYx-(4-Y))$ and $SIG(DZ\backslash Dzx-(4-Z))$ to compute $DYx-(4-Z)'$ and $DZx-(4-Y)'$. We can now compare the stored $DYx-(4-Z)$ and $DZx-(4-Y)$ and the recomputed $DYx-(4-Z)'$ and $DZx-(4-Y)'$. If both are equal it is known that there are multiple errors. If both differ it is known know that there are multiple errors. If only one differs, say it was $DYx-(4-Z)'$ that differed, the determination of the stored $SIG(DZ\backslash DZx-(4-Z))$ is retried using $DYx-(4-Z)'$. If this updated version of the stored SIG matches the one computed from the data, the sub-block comprising an error and the correct reconstructed sub-block have been determined. Accordingly, embodiments allow recovery in situation 6) in cases with only a single sub-block comprising an error.

When there are 3 or more SIG mismatches, it is known that there are multiple corrupted sub-blocks and that direct recovery is not possible. However, soft decoding techniques may still be able to recover the data.

In a typical implementation, the number of sub-blocks of data comprised by a node is very much larger than K+1. For example, the number of sub-blocks may be 1024 or greater. Accordingly, within almost all of the data of a node, any number of errors can occur and the errors can be corrected. Embodiments therefore provide improved recovery from data errors. In addition embodiments improve the security of the data as the signatures can only be computed by an authorised user. If source data is changed, i.e. tampered with, by malicious activity of an unauthorised operator, the unauthorised operator is unable to correctly change signatures of the source data. The signatures of the source data can therefore be used to detect the malicious activity. The detection of the tampering of data is efficient as it may be detected locally by each node and transmission of all of the data in each of the nodes is not required.

Preferably, the signatures are generated by public and private key pairs. The data storage system is provided with, or can obtain, each public key. The private keys are preferably securely stored in the system of an authorised entity only. In order for a determination to be made that the signature of data in the data storage system is correct, only the public keys are required. The determination can therefore be quickly and easily made by the data storage system itself. However, the generation of signatures from data in the data storage system requires the private key(s). The signatures can therefore be easily used by the data storage system, or any other system with access to the data in the data storage system and the public keys, to verify if data in the data storage system is correct. However, the signatures can only be generated by the system of an authorised entity.

Another way of the data storage system verifying if a signature correctly corresponds to the data that the signature should have been generated in dependence upon is for a secure computing environment, such as a sandbox, to be provided either in the data storage system or in communication with the data storage system. The secure computing environment has the required data for verifying the signatures, such as the private keys. To verify a signature, the signature and the data that the signature should have been generated in dependence upon are input to the secure computing environment. The signature is then verified within the secure computing environment using the required data for verifying the signatures and the input data. The output from the secure computing environment can be no more than a YES or NO response that indicates whether or not the signature was correct.

Preferably, the verification of a signature of a node is performed at the node itself. Local verification of signatures at each node reduces the communication of data within the data storage system.

The system of an authorised entity is able to generate the signatures and has the required data for this, e.g. the private key of the signature. The system authorised entity may be comprised by the data storage system. The required data for generating the signatures is preferably stored in a secure computing environment, such as a sandbox. It is preferable for the system of the authorised entity to be separate from that of the data storage system so that the security of the signatures is not compromised if the data storage system is compromised.

During a repair operation of the data storage system, if lost, corrupted or tampered with data does not comprise a signature, a standard repair may be performed without signature generation being required.

When lost, corrupted or tampered with data does comprise a signature, the required data for generating the signatures is needed for a repair operation to be performed.

If the data storage system has all of the required data for generating the signatures, the data storage system itself can generate the required signatures.

When the data storage system does not have all of the required data for generating the signatures, the communication between the data storage system and the separate/remote system of the authorised entity is necessary. The system of the authorised entity may send the signatures to the data storage system. Alternatively, the source/redundant data in the data storage system that is required for generating the signatures may be sent to the system of the authorised entity, the signatures are generated in the system of the authorised entity and the signatures are sent back to the data storage system. The data required of generating the signatures is therefore always retained in the system of the authorised entity.

As defined above, the number of source nodes in the first embodiment is K. K may be one or more.

FIG. 2 shows an embodiment with K=1. Advantageously, this embodiment improves the determination of where an error has occurred, and therefore improves error recovery, over a known data mirroring systems.

A second embodiment is shown in FIG. 3. The second embodiment differs from the first embodiment in that a second redundant node is provided. The presence of an additional redundant node allows MDS coding to be used to improve data recovery further. The data coding is still systematic.

In FIG. 3, and all of the other Figures, the powers of values, i.e. $(\ )^z$, such as $D3_1^3$ and $SIG(D2\backslash D2_x)^2$, indicate operations performed in a higher GF field than GF(2). Such operations are known in, for example, Reed-Solomon coding in order to generate nodes of data that are MDS.

The structure and properties of the source nodes D1, D2 and D3 and the redundant node Dr1 in FIG. 3 is the same as that described above for the first embodiment. In particular, the signatures for each of these nodes are unchanged from the first embodiment.

The redundant node Dr2 comprises the same number of sub-blocks as the other nodes, with the sub-blocks of each node again all being the same size. In the second embodiment, each block of data now comprises one sub-block from each of the source nodes and one sub-block from each of the two redundant nodes.

In Dr2, individual sub-blocks that store the entire data in Dr2 are $Dr2_1$ to $Dr2_X$.

The data in Dr2 can be coded according to any coding technique but preferably an MDS coding technique is applied, such as Reed Solomon (RS) coding. The coding of data in Dr2 can be performed by coding in a higher field than GF(2).

As shown in FIG. 3, each of the redundant sub-blocks in Dr2 that are blocks with an associated signature are dependent both on the same coding technique of the source nodes used to generate Dr2 and also the signature associated with the block.

For signatures that are associated with a source node, the same signature is combined with source data to generate the redundant sub-blocks in Dr2.

None of the sub-blocks in Dr2 are dependent on the signature associated with the Dr1 node.

There is a new signature that is associated with the Dr2 node and the same block that is associated with the signature of the Dr1 node.

The signature associated with the Dr2 node is dependent on all of the sub-blocks in the Dr2 node except the sub-block comprised by the block associated with the signature of the Dr2 node.

The coding technique preferably comprises multiplying $SIG(Dr1\backslash Dr1x)$ and $SIG(Dr2\backslash Dr2x)$ by different GF coefficients. If this condition is not met, there may be some circumstances in which it is not possible to recover the SIG and the error correction capability will be reduced.

An alternative to the implementation shown in FIG. 3 is for the sub-block $Dr2_X$ in the Dr2 node to be calculated in dependence on $SIG(D2\backslash D2_x)$ instead of $SIG(D2\backslash D2_x)^2$ as shown in FIG. 6. This avoids the use of higher GF field mathematics.

Advantageously, data verification is improved and data recovery is possible when any number of errors occur in any node.

In addition, if the Dr2 node is not used then the coded data becomes the same as that for the first embodiment. All of the advantageous recovery properties as described for the first embodiment are therefore maintained.

FIG. 4 shows another implementation of the present embodiment. This differs from the implementation shown in FIG. 3 in that the signatures for the redundant nodes are associated with different blocks. The implementation shown in FIG. 4 has improved error detection and recovery properties from that shown in FIG. 3 and it is not necessary to ensure that SIG(Dr1\Dr1x) and SIG(Dr2\Dr2x) are multiplied by different GF coefficients For both of the above-described implementations of the present embodiment, error detection and correction are improved over a standard MDS coding technique. Standard error recovery, such as Reed-Solomon, can be used in addition to the direct use of the additional signatures. There may therefore be more than one possible way of correcting errors in the data.

The signatures can also be used to aid soft-decoding decisions. The code can also be viewed as a concatenated error correction code, with Reed-Solomon as the outer code. It is also possible to use the signatures in soft-decoding decisions with Reed-Solomon as the inner code. In this case the signatures provide hard knowledge regarding correct data.

The present embodiment is not limited to the specific number of source data nodes described above and there may be any number of source data nodes. The number of blocks with only one associated signature is at least K and K signatures are each associated with a different one of the source nodes. For the redundant nodes, implementations include one or more blocks that are each associated with two or more signatures. Implementations also include, alternatively or in addition, one or more blocks that are each associated with only one signature.

According to a third embodiment, the number of redundant nodes, R, is increased to three or more. There may also be any number of source nodes and K is not restricted to three. Each node comprises the same number of sub-blocks, with the sub-blocks of each of the nodes all being the same size. Each block of data comprises one sub-block from each of the K source nodes and one sub-block from each of the R redundant nodes.

The data coding is preferably still systematic and preferably an MDS coding technique is used to determine how to code the data in the redundant nodes, as described for the second embodiment.

The number of blocks with only one associated signature is at least K as K signatures are respectively associated with the K source nodes.

Embodiments include there being one block that is associated with up to R signatures, one for each of the redundant nodes. However, a particular preferred embodiment is shown in FIG. 5 in which all blocks, for both the source and redundant nodes, are associated with only one signature. The embodiment shown in FIG. 5 is an extension of that shown in FIG. 4. In FIG. 5, as well as some of the other figures, the sub-blocks that are generated in dependence on a signature are shown by the name of the node that the signature corresponds to followed by the letter 'c'.

The number of redundant nodes that have blocks determined in dependence on a signature is at least 1 and less than or equal to R. Embodiments therefore include one or more of the redundant nodes with no sub-blocks that are generated in dependence on a signature.

Implementations of a fourth embodiment are shown in FIGS. 6 to 8. The fourth embodiment improves on known systems that use triplication, i.e. each of three nodes are intended to store exactly the same data.

In the implementation shown in FIG. 6, there are three nodes that are shown as D1, D2 (or Dr1) and D3 (or Dr2). D1 only comprises source data. The other nodes mostly comprise a copy of the source data but also store signatures of the data as shown. An alternative to the implementation shown in FIG. 6 is for the sub-block in the D3 node that is in the same block as $D1_{x-2}$ in D1 to be calculated in dependence on $SIG(D1\backslash D1_{x-2})^2$ instead of $SIG(D1\backslash D1_{x-2})$ as shown in FIG. 6. This use of higher GF field mathematics improves the data recovery capability.

Another implementation of the fourth embodiment is shown in FIG. 7.

Another implementation of the fourth embodiment is shown in FIG. 8.

Advantageously, the implementations of the fourth embodiment all improve on known triplication techniques because the verification of the data and correction of errors is improved.

In the above embodiments, the data is arranged in a data array and the systematic coding of the data results in data array comprising separate source nodes and redundant nodes. According to fifth and sixth embodiments, the under lying coding of the data is still systematic but the signatures are included in both source nodes and redundant nodes instead of just the redundant nodes.

A fifth embodiment is shown in FIG. 9. The embodiment is similar to the first embodiment as shown in FIG. 1 however the signatures are not all stored in the same node. The signatures are alternatively stored across all of the nodes, including the source nodes.

A sixth embodiment is shown in FIG. 10. The embodiment is similar to the fourth embodiment as shown in FIGS. 6 to 8 however the signatures are alternatively stored across all of the nodes, including the source nodes.

According to a seventh embodiment, a plurality of sets of source nodes and redundant nodes are provided. Sub-blocks in one or more of the redundant nodes in one of the sets are generated that comprise signatures of one or more of the source nodes in all of the sets. Advantageously, all of the signatures for verifying the source data can be obtained from sub-blocks in only one redundant node. This is more efficient than obtaining signatures from a plurality of redundant nodes.

An implementation of the seventh embodiment is shown in FIG. 11. In the shown implementation, there are three sets of source and redundant nodes. Set 1 comprises source nodes D1 and D2 as well as redundant nodes R1 and R2. Set 2 comprises source nodes D3 and D4 as well as redundant nodes R3 and R4. Set 3 comprises source nodes D5 and D6 as well as redundant nodes R5 and R6.

The data in the redundant nodes of Set 1 and Set 2 are coded according to the second embodiment. Accordingly, as shown in FIG. 11, R1 has a sub-block that is dependent on the signature associated with node D1, a further sub-block that is dependent on the signature associated with node D2 and a further sub-block that is dependent on the signature associated with node R1. Nodes R2, R3 and R4 are similarly determined.

For Set 3, the redundant node R5 has a sub-block that is dependent on the signature associated with node D5 and a further sub-block that is dependent on the signature associated with node D6. However, each of these signatures is generated differently from the corresponding signatures in the other redundant nodes. Instead of the signatures being dependent on all sub-blocks in the node except one of the sub-blocks, the signatures are dependent on all of the sub-blocks in the node. Four of the other sub-blocks of R5 are then combined, for example by XOR operations or with operations in a higher field than GF(2), with the signatures for the source nodes in the other sets. After the other sub-blocks in R5 have been determined, a sub-block that is dependent on the signature associated with node R5 is also generated. The redundant node R6 can generated in a corresponding manner to R5, with the signatures for nodes D5 and D6 generated differently, or be generated as with all sub-blocks of the redundant node being dependent on a combination of sub-blocks of source data only.

Set 3 is the final set to be generated. Embodiments include there being any number of sets. All of the sets are generated as described for Set 1 and Set 2 above except for the final set which is generated as described for Set 3.

When recovering the data, the final set to be generated, i.e. Set 3 in the above embodiment, should be recovered after the other sets that need to be recovered have been recovered.

The seventh embodiment also includes a number of variations to the specific implementation shown in FIG. 11 and described above. For example, the coding technique may be according to any of the other coding techniques of embodiments described herein. Each set may also comprise any number of source nodes and any number of redundant nodes.

According to a further embodiment, a sub-block may be dependent on more than one signature. FIG. 12 shows an embodiment in which a sub-block is dependent on more one differently calculated signatures. The signatures do not need to be calculated in dependence on contiguous sub-blocks. The different signatures may each be generated in dependence on different subsets of the sub-blocks comprised by the same node. Signatures may also be calculated with more than one sub-block of the node not used in the calculation of the signature.

FIG. 13 shows an embodiment in which a sub-block is generated in dependence on a plurality of signatures and the signatures have been generated in dependence on sub-blocks of different nodes. The sub-block may be generated in dependence on signatures have been generated in dependence on sub-blocks of source and/or redundant nodes.

FIG. 14 shows an embodiment that is a modification to any of the above described embodiments. Additional signatures, indicated as Dĉ, are generated for the data in each of the source and redundant nodes. Although all of the additional signatures are indicated with the same symbol Dĉ, the signatures will be different from each other as they are calculated in dependence on data in different nodes. Each additional signature is not combined with data in one of the original sub-blocks of a node but is instead stored either within its own sub-block of the node or, preferably, stored as metadata of each node. The verification of data in each node is therefore improved. For example, any one of the source nodes can be independently verified by the signature in its metadata without any of the redundant nodes being accessed. Verification of the source nodes is therefore possible even if the redundant nodes have been lost.

In the embodiment shown in FIG. 14, additional signatures have been generated for each of two source nodes and two redundant nodes. However, the additional signatures may alternatively have only been generated for the source nodes or any other subset of the nodes.

Embodiments also include the additional signatures not being stored as metadata of the nodes but instead being stored in a separate part of the data storage system or remote from the data storage system.

FIG. 15 shows an embodiment that is another modification to any of the above described embodiments. An additional signature, Dĉ, is generated for the data in all of the source nodes. The additional signature is not stored in any of the nodes. Although the additional signature may be stored as metadata of a nodes, the additional signature is preferably stored in another part of the data storage system or remote from the data storage system. The signature allows verification of all of the source data. To use the signature requires access to all of the source data. However, if only some of the source data needs to be verified, it is more efficient to use the signatures of subsets of the source data, that are generated as described for the previous embodiments, and stored in the redundant nodes.

Figure 16:
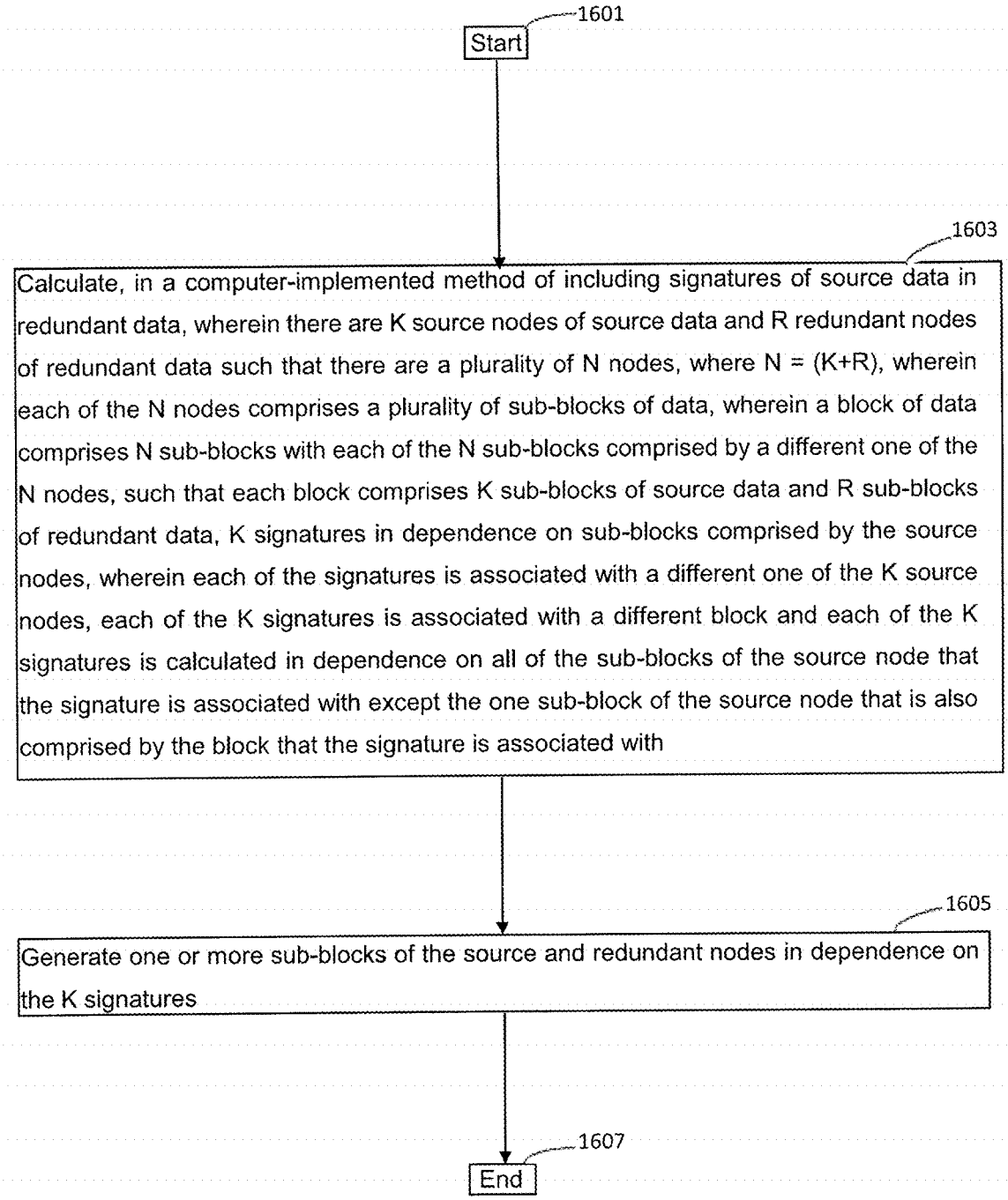
FIG. 16 is a flowchart of a method according to an embodiment.

FIG. 16 is a flowchart of processes according to an embodiment of a computer-implemented method of including signatures of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data.

In step 1601, the process begins.

In step 1603, K signatures are calculated in dependence on sub-blocks comprised by the source nodes, wherein each of the signatures is associated with a different one of the K source nodes, each of the K signatures is associated with a different block and each of the K signatures is calculated in dependence on all of the sub-blocks of the source node that the signature is associated with except the one sub-block of the source node that is also comprised by the block that the signature is associated with In step 1605, one or more sub-blocks of the source and redundant nodes are generated in dependence on the K signatures.

In step 1607, the process ends.

Embodiments of the invention also include a number of modifications and variations to the embodiments as described above.

The signatures of embodiments may have non-repudiation functionality. This functionality may be provided by the signatures comprising dates in their creation and/or use. In order for verification of the signatures in all circumstances to be possible, the signatures may use either a known fixed date or the used dates may be stored.

Embodiments include end to end protection being provided. Signatures may be included with the data all the way to an end receiver. For replication, two signatures may be included, one for protecting the data and one that protects the signature of the data.

The signatures of embodiments are preferably capable of incremental updates.

Embodiments include re-arranging the data prior to a signature being generated in dependence on the data so that the all signatures are computed on the same data range. The data is rearranged to match a particular layout. The signature generation can then always skip the same part of data, e.g. the last part of data. This may increase the efficiency of the signature generation.

Embodiments also include encrypting the source data prior to it being stored in the data storage system so as to increase the security of the data.

Embodiments are not restricted to the underlying coding of the data being MDS codes or standard Reed-Solomon. Any forward error correction (FEC) code can be used, such as low-density parity-check (LDPC), Local Reconstruction Codes (LRC), minimum-bandwidth regenerating (MBR) codes and minimum-storage regenerating (MSR) codes. Also, there does not need to be a fixed number of redundancy nodes. Rateless erasure codes such as fountain codes can also be used. In addition, embodiments are not restricted to the underlying coding of the data being systematic. The underlying coding may alternatively be non-systematic.

A preferred embodiment for encoding source data first comprises calculating all of the signatures of the source data and including these signatures within sub-blocks of the source nodes according to any of the techniques described in the present document. All of the redundant nodes are then calculated according to the underlying coding scheme, e.g. RS coding. All of the signatures of the redundant nodes are then calculated and included within sub-blocks of the redundant nodes according to any of the techniques described in the present document. The source data nodes, without the signatures included, are then stored/used. The source data nodes with the signatures included are no longer required and can be discarded.

To recover the data, the non-lost source data nodes (without the signatures included) are obtained/read. All of the signatures of the non-lost source data are then calculated and included within sub-blocks of the non-lost source nodes. All of the signatures of the redundant nodes are then calculated and subtracted from the redundant nodes. Recovery according to the coding scheme is then performed if it is determined that recovery is required. All of the signatures of the recovered source data are calculated and subtracted from the recovered source nodes. Advantageously, the signatures are transparent to the coding scheme both during encoding and decoding.

The sub-blocks of nodes that are generated in dependence on signatures may be located anywhere within the nodes and are not restricted to being the last sub-blocks in the node. By spreading out the sub-blocks that are generated in dependence on signatures within a node, the likelihood of losing all of the signature data due to burst errors is reduced.

Embodiments include the same sub-block being included in more than one signature. Preferably, every sub-block is included in at least one signature. A signature may be generated in dependence on a sub-block that has itself been generated in dependence on a signature.

Embodiments include signatures only being determined for source nodes and not redundant nodes.

Embodiments include any technique of combining signatures with sub-blocks of source and redundant nodes. Advantageously, the information provided by the signatures is contained in the source and redundant nodes and the metadata of the system is not increased.

Embodiments include rearranging the source data prior to coding. The source data that is used to generate coded data is therefore a rearranged version of the source data that is received for coding. Advantageously, rearranging the source data allows the signatures to be computed in a contiguous way, and not in a way that is restricted by how the source data was received. The location of data that is not included in each of the signatures can therefore be moved to any location within the original source data that is received for coding.

The actual generation of coded data in dependence on source data according to embodiments can be performed with known techniques and using known hardware. The processes required to use the techniques according to embodiments to generate a plurality of source nodes and redundant nodes in a data storage system/network of a data centre storing the coded data would be a straightforward task for the skilled person. The skilled person would also be able to use known hardware to reconstruct one or more source nodes in order to implement embodiments.

The nodes according to embodiments include single data disks, or drives, or groups or data disks, or drives. A node includes any form of data storage element, a part of such an element or multiple such elements. In particular, a node can be any logical entity where data can be stored, and can be anything from a whole, a group of or parts of physical storage devices or locations including but not limited to memory based storage devices such as RAM and SSDs, hard drives, tape storage, optical storage devices, servers and data centers. The method according to embodiments may be performed within a single SSD disk. The method according to embodiments may be performed between chips inside a SSD, or between banks inside (flash) chips.

The data storage system of embodiments is preferably a cloud based data storage system.

The storage of the data in a data storage system is not limited to the data storage system having nodes, i.e. data drives or sections of a data drive, that are only for use as a store of source data node or redundant data. A mapping may be introduced so that a data drive may store redundant data within a source data node and vice-versa. This interleaving of data changes the mapping of coded data to stored data and can be used to control the read operations from a data storage system, for example to ensure that the network traffic is balanced across the data storage system.

Although data storage is a particularly preferable application for the coding techniques disclosed herein, embodiments also include the generation of codes for any application, such as data transmission. For example, the nodes and/or blocks may correspond to data packets for transmission over a network. In particular, the embodiments can be used to determine data packets for transmission as TCP/IP or UDP packets, as well as other form of data packets used for data transmission over a network.

Embodiments also include the following numbered clauses:

1. A computer-implemented method of including signatures of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method comprising:

calculating K signatures in dependence on sub-blocks comprised by the source nodes, wherein each of the signatures is associated with a different one of the K source nodes, each of the K signatures is associated with a different block and each of the K signatures is calculated in dependence on all of the sub-blocks of the source node that the signature is associated with except the one sub-block of the source node that is also comprised by the block that the signature is associated with; and generating one or more sub-blocks of the source and/or redundant nodes in dependence on the K signatures.

2. The method according to clause 1, the method further comprising:

calculating one or more further signatures in dependence on sub-blocks comprised by one or more redundant nodes, wherein each of said further signatures is associated with a different one of the R redundant nodes, each of said further signatures is associated with a block that is different from all other blocks for which there is an associated signature that is associated with a source node, and each of said further signatures is calculated in dependence on all of the sub-blocks of the redundant node that the signature is associated with except the one sub-block of the redundant node that is also comprised by the block that the signature is associated with; and generating one or more sub-blocks of the source and/or redundant nodes in dependence on said further signatures.

3. The method according to clause 1 or 2, wherein different sub-blocks of the same redundant node are generated in dependence on each of the signatures.

4. The method according to clause 3, wherein sub-blocks comprised by any of the source nodes are not generated in dependence on a signature.

5. The method according to any preceding clause, the method further comprising generating, for each block with an associated signature, a sub-block of the block that is comprised by a redundant node in dependence on a combination of all of the sub-blocks of the block that are comprised by a source node and the signature associated with the block.

6. The method according to any preceding clause, the method further comprising generating, for each sub-block in at least one redundant node, the sub-block in dependence on a combination of all of the sub-blocks in the same block as said sub-block and comprised by source nodes.

7. The method according to any preceding clause, the method further comprising generating, for at least one redundant node, the sub-blocks of the redundant node that are not comprised by blocks with an associated signature in dependence on a combination of sub-blocks comprised by the source data nodes only.

8. The method according to any preceding clause, wherein one or more of the sub-blocks of one or more of the redundant nodes are generated in dependence on a XOR combination.

9. The method according to any preceding clause, wherein R is 1.

10. The method according to any preceding clause, wherein R is 2 or more.

11. The method according to any preceding clause, wherein K is 1.

12. The method according to any preceding clause, wherein K is 2 or more.

13. The method according to any preceding clause, wherein the size of each sub-block is the same as the size of each signature.

14. The method according to any preceding clause, wherein each signature is calculated according to a technique that allows verification of the data that the signature is generated in dependence on.

15. The method according to clause 14, wherein each signature is calculated as any of a digital signature algorithm, message authentication code, keyed-hash message authentication code, ECDSA, RSA, Full Domain Hash or Boneh-Lynn-Shacham.

16. The method according to clause 10, or any clause dependent thereon, wherein each block with an associated signature is associated with first and second signatures, the first signature being the signature as in any preceding clause, and a sub-block that is comprised by a first redundant node is generated in dependence on said first signature, and a sub-block that is comprised by a second redundant node is generated in dependence on said second signature.

17. The method according to clause 16, wherein for each block with a first signature that is associated with a source node, the second signature is the same as the first signature.

18. The method according to any of clause 16 or 17, wherein for each block with a first signature associated with a first redundant node, the second signature is generated in dependence on all of the sub-blocks of a second redundant node except the one sub-block of the second redundant node that is comprised by the block associated with the signature.

19. The method according to clause 10, or any of clauses 11 to 17 when dependent on clause 10, wherein in each of the redundant nodes, there is a sub-block that is generated in dependence on a signature that is associated with the redundant node that comprises said sub-block, and said signature is generated in dependence on all of the sub-blocks of the redundant node except said sub-block that is generated in dependence on said signature.

20. The method according to clause 19, wherein there is no block that comprises two sub-blocks that are both generated in dependence on signatures that have both been generated in dependence on sub-blocks of redundant nodes.

21. The method according to any preceding clause, wherein, prior to any sub-blocks being combined with a signature, all of sub-blocks comprised by a redundant node are generated in accordance with any of maximum distance separable, MDS, coding, Reed-Solomon coding, forward error correction (FEC) coding, low-density parity-check (LDPC) coding, Local Reconstruction Codes (LRC) coding, minimum-bandwidth regenerating (MBR) coding, minimum-storage regenerating (MSR) coding, or coding with rateless codes or coding with fountain codes.

22. The method according to any preceding clause, wherein, prior to any sub-blocks being combined with a signature, all of sub-blocks comprised by all of the source and redundant nodes are generated in accordance with either a systematic or a non-systematic coding technique.

23. The method according to any preceding clause, wherein the one or more sub-blocks of one or more redundant nodes are generated in dependence on the signature by using operations in a GF field that is higher than GF(2).

24. The method according to any preceding clause except clause 4, wherein one or more of the sub-blocks comprised by a source node are generated in dependence on a signature.

25. The method according to clause 24, wherein no block comprises two sub-blocks that are generated in dependence on a signature.

26. The method according to any preceding clause, the method further comprising generating one or more of the sub-blocks in dependence on two signatures.

27. The method according to clause 26, wherein the one or more of the sub-blocks that are generated in dependence on two signatures are generated in dependence on signatures that have been generated in dependence on sub-blocks comprised by different source nodes.

28. The method according to any preceding clause, wherein said signature, that is calculated in dependence on all of the sub-blocks of the source node that the signature is associated with except the one sub-block of the source node that is also comprised by the block that the signature is associated with, is incrementally updatable.
29. The method according to any preceding clause, wherein each node is data drive of a data storage system.
30. The method according to any preceding clause, wherein each block is a data packet for transmission over a network.
31. The method according to any preceding clause, wherein each signature is generated using a private key.
32. The method according to clause 31, wherein the private key is retained within the system of an authorised entity.
33. The method according to clause 31 or 32, wherein each signature is generated using a private key and public key pair.
34. The method according to clause 33, wherein the verification of the data that a signature has been generated in dependence on only requires the public key and not the private key.
35. The method according to any preceding clause, wherein the verification of a signature can be performed at the node comprising the signature.
36. The method according to any preceding clause, the method further comprising generating and storing one or more signatures with each of the signatures being of all of the data in one of the nodes;
wherein each of said generated and stored signatures are stored as additional data in a node, as metadata of a node or remote from the nodes.
37. The method according to any preceding clause, the method further comprising generating and storing a signature of all of the data in the source nodes;
wherein the generated and stored signature is stored as additional data in a node, as metadata of a node or remote from the nodes.
38. The method according to any preceding clause, wherein the source data is encrypted.
39. A computer-implemented method, wherein there are a plurality of sets of nodes, and wherein each set comprises one or more source nodes and one or more redundant nodes, the method comprising:
generating, for each set, one or more redundant nodes of the set in dependence on signatures of the source nodes of the set; and
generating one or more of the redundant nodes of one of the sets further in dependence on signatures of the source nodes in all of the other sets.
40. The method according to clause 39, wherein one or more of the nodes of one or more of the sets are generated according to the method of any of clauses 1 to 38.
41. The method according to clause 40, wherein one or more of the nodes of one of the sets comprises one or more signatures that are generated in dependence on all of the sub-blocks of a node.
42. A computer-implemented method of determining if a data error has occurred, the method comprising:
obtaining a plurality of sub-blocks of source data;
obtaining one or more sub-blocks of redundant data, wherein at least one of the sub-blocks of redundant data has been generated in dependence on a signature of the sub-blocks of source data;
determining the signature that said at least one of the sub-blocks of redundant data has been generated in dependence on;
calculating a signature in dependence on the obtained sub-blocks of source data; and
determining that a data error has occurred in dependence on a comparison of the signature that said at least one of the sub-blocks of redundant data has been generated in dependence on and the signature calculated in dependence on the obtained sub-blocks of source data.
43. The method according to clause 42, wherein the sub-blocks of source and redundant data have been generated in accordance with the method of any of clauses 1 to 41.
44. The method according to clause 43, the method further comprising correcting a detected error by applying logical deduction.
45. A computer readable medium comprising instructions that, when executed, cause a computing device to perform the method of any preceding clause.
46. A computer program comprising instructions that, when executed by a computing system, cause the computing system to perform the method of any of clauses 1 to 44.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

Methods and processes described herein can be embodied as code (e.g., software code) and/or data. Such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system). It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), phase-change memory and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

What is claimed is:
1. A computer-implemented method of including signatures of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method comprising:

calculating K signatures in dependence on sub-blocks comprised by the source nodes, wherein each of the signatures is associated with a different one of the K source nodes, each of the K signatures is associated with a different block and each of the K signatures is calculated in dependence on all of the sub-blocks of the source node that the signature is associated with except the one sub-block of the source node that is also comprised by the block that the signature is associated with; and generating one or more sub-blocks of the source and/or redundant nodes in dependence on the K signatures, wherein each signature is calculated according to a technique that allows verification of the data that the signature is generated in dependence on; and wherein each signature is calculated as any of a digital signature algorithm, message authentication code, keyed-hash message authentication code, ECDSA, RSA, Full Domain Hash or Boneh-Lynn-Shacham.

2. The method according to claim 1, the method further comprising:

calculating one or more further signatures in dependence on sub-blocks comprised by one or more redundant nodes, wherein each of said further signatures is associated with a different one of the R redundant nodes, each of said further signatures is associated with a block that is different from all other blocks for which there is an associated signature that is associated with a source node, and each of said further signatures is calculated in dependence on all of the sub-blocks of the redundant node that the signature is associated with except the one sub-block of the redundant node that is also comprised by the block that the signature is associated with; and generating one or more sub-blocks of the source and/or redundant nodes in dependence on said further signatures;

wherein different sub-blocks of the same redundant node are generated in dependence on each of the signatures;

wherein sub-blocks comprised by any of the source nodes are not generated in dependence on a signature;

the method further comprising generating, for each block with an associated signature, a sub-block of the block that is comprised by a redundant node in dependence on a combination of all of the sub-blocks of the block that are comprised by a source node and the signature associated with the block;

the method further comprising generating, for each sub-block in at least one redundant node, the sub-block in dependence on a combination of all of the sub-blocks in the same block as said sub-block and comprised by source nodes; and the method further comprising generating, for at least one redundant node, the sub-blocks of the redundant node that are not comprised by blocks with an associated signature in dependence on a combination of sub-blocks comprised by the source data nodes only.

3. The method according to claim 1, wherein one or more of the sub-blocks of one or more of the redundant nodes are generated in dependence on a XOR combination.

4. The method according to claim 1, wherein R is 1, or wherein R is 2 or more, and/or wherein K is 1, or wherein K is 2 or more.

5. The method according to claim 1, wherein the size of each sub-block is the same as the size of each signature.

6. The method according to claim 1, wherein each block with an associated signature is associated with first and second signatures, and a sub-block that is comprised by a first redundant node is generated in dependence on said first signature, and a sub-block that is comprised by a second redundant node is generated in dependence on said second signature;

wherein for each block with a first signature that is associated with a source node, the second signature is the same as the first signature;

wherein for each block with a first signature associated with a first redundant node, the second signature is generated in dependence on all of the sub-blocks of a second redundant node except the one sub-block of the second redundant node that is comprised by the block associated with the signature;

wherein in each of the redundant nodes, there is a sub-block that is generated in dependence on a signature that is associated with the redundant node that comprises said sub-block, and said signature is generated in dependence on all of the sub-blocks of the redundant node except said sub-block that is generated in dependence on said signature; and wherein there is no block that comprises two sub-blocks that are both generated in dependence on signatures that have both been generated in dependence on sub-blocks of redundant nodes.

7. The method according to claim 1, wherein, prior to any sub-blocks being combined with a signature, all of sub-blocks comprised by a redundant node are generated in accordance with any of maximum distance separable, MDS, coding, Reed-Solomon coding, forward error correction (FEC) coding, low-density parity-check (LDPC) coding, Local Reconstruction Codes (LRC) coding, minimum-bandwidth regenerating (MBR) coding, minimum-storage regenerating (MSR) coding, or coding with rateless codes or coding with fountain codes.

8. The method according to claim 1, wherein, prior to any sub-blocks being combined with a signature, all of sub-blocks comprised by all of the source and redundant nodes are generated in accordance with either a systematic or a non-systematic coding technique.

9. The method according to claim 1, wherein the one or more sub-blocks of one or more redundant nodes are generated in dependence on the signature by using operations in a GF field that is higher than GF(2).

10. The method according to claim 1, wherein one or more of the sub-blocks comprised by a source node are generated in dependence on a signature;

wherein no block comprises two sub-blocks that are generated in dependence on a signature;

the method further comprising generating one or more of the sub-blocks in dependence on two signatures;

wherein the one or more of the sub-blocks that are generated in dependence on two signatures are generated in dependence on signatures that have been generated in dependence on sub-blocks comprised by different source nodes; and wherein said signature, that is calculated in dependence on all of the sub-blocks of the source node that the signature is associated with except the one sub-block of the source node that is also comprised by the block that the signature is associated with, is incrementally updatable.

11. The method according to claim 1, wherein each node is data drive of a data storage system;
wherein each block is a data packet for transmission over a network;
wherein each signature is generated using a private key;
wherein the private key is retained within the system of an authorised entity;
wherein each signature is generated using a private key and public key pair; and
wherein the verification of the data that a signature has been generated in dependence on only requires the public key and not the private key.

12. The method according to claim 1, wherein the verification of a signature can be performed at the node comprising the signature.

13. The method according to claim 1, the method further comprising generating and storing one or more signatures with each of the signatures being of all of the data in one of the nodes;
wherein each of said generated and stored signatures are stored as additional data in a node, as metadata of a node or remote from the nodes.

14. The method according to claim 1, the method further comprising generating and storing a signature of all of the data in the source nodes;
wherein the generated and stored signature is stored as additional data in a node, as metadata of a node or remote from the nodes.

15. The method according to claim 1, wherein the source data is encrypted.

16. A computer-implemented method, wherein there are a plurality of sets of nodes, and wherein each set comprises one or more source nodes and one or more redundant nodes, the method comprising:
generating, for each set, one or more redundant nodes of the set in dependence on signatures of the source nodes of the set; and
generating one or more of the redundant nodes of one of the sets further in dependence on signatures of the source nodes in all of the other sets,
wherein each signature is calculated according to a technique that allows verification of the data that the signature is generated in dependence on; and
wherein each signature is calculated as any of a digital signature algorithm, message authentication code, keyed-hash message authentication code, ECDSA, RSA, Full Domain Hash or Boneh-Lynn-Shacham.

17. The method according to claim 16, wherein one or more of the nodes of one or more of the sets are generated according to a method of including signatures of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method of including signatures of source data in redundant data comprising:
calculating K signatures in dependence on sub-blocks comprised by the source nodes, wherein each of the signatures is associated with a different one of the K source nodes, each of the K signatures is associated with a different block and each of the K signatures is calculated in dependence on all of the sub-blocks of the source node that the signature is associated with except the one sub-block of the source node that is also comprised by the block that the signature is associated with; and
generating one or more sub-blocks of the source and/or redundant nodes in dependence on the K signatures;
wherein one or more of the nodes of one of the sets comprises one or more signatures that are generated in dependence on all of the sub-blocks of a node.

18. A computer-implemented method of determining if a data error has occurred, the method comprising:
obtaining a plurality of sub-blocks of source data;
obtaining one or more sub-blocks of redundant data, wherein at least one of the sub-blocks of redundant data has been generated in dependence on a signature of the sub-blocks of source data;
determining the signature that said at least one of the sub-blocks of redundant data has been generated in dependence on;
calculating a signature in dependence on the obtained sub-blocks of source data; and
determining that a data error has occurred in dependence on a comparison of the signature that said at least one of the sub-blocks of redundant data has been generated in dependence on and the signature calculated in dependence on the obtained sub-blocks of source data,
wherein each signature is calculated according to a technique that allows verification of the data that the signature is generated in dependence on; and
wherein each signature is calculated as any of a digital signature algorithm, message authentication code, keyed-hash message authentication code, ECDSA, RSA, Full Domain Hash or Boneh-Lynn-Shacham.

19. The method according to claim 18, wherein the sub-blocks of source and redundant data have been generated according to a method of including signatures of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method of including signatures of source data in redundant data comprising:
calculating K signatures in dependence on sub-blocks comprised by the source nodes, wherein each of the signatures is associated with a different one of the K source nodes, each of the K signatures is associated with a different block and each of the K signatures is calculated in dependence on all of the sub-blocks of the source node that the signature is associated with except the one sub-block of the source node that is also comprised by the block that the signature is associated with; and
generating one or more sub-blocks of the source and/or redundant nodes in dependence on the K signatures;
the method of determining if a data error has occurred further comprising correcting a detected error by applying logical deduction.

* * * * *